(12) United States Patent
Becker et al.

(10) Patent No.: US 7,367,630 B2
(45) Date of Patent: May 6, 2008

(54) INTEGRATED SEAT OF AN AUTOMOTIVE VEHICLE

(75) Inventors: Burckhard Becker, Solingen (DE); Robert Houston, Leichlingen (DE); Jörg May Wölfel, Remscheid (DE)

(73) Assignee: C. Rob Hammerstein GmbH & Co. KG (DE)

( * ) Notice: Subject to any disclaimer, the term of this patent is extended or adjusted under 35 U.S.C. 154(b) by 281 days.

(21) Appl. No.: 10/936,024

(22) Filed: Sep. 8, 2004

(65) Prior Publication Data

US 2005/0046267 A1 Mar. 3, 2005

(30) Foreign Application Priority Data

Aug. 9, 2003 (DE) ................. 103 41 745

(51) Int. Cl.
*A47C 31/00* (2006.01)
(52) U.S. Cl. .................. 297/468; 297/483; 297/464; 297/474
(58) Field of Classification Search ............... 297/464, 297/465, 474, 475, 478, 484, 485; 296/65.01; 280/806; 180/268
See application file for complete search history.

(56) References Cited

U.S. PATENT DOCUMENTS

| | | | | |
|---|---|---|---|---|
| 5,088,794 A | * | 2/1992 | Iwami et al. ............... 297/483 |
| 5,439,272 A | * | 8/1995 | Hallet et al. ................ 297/479 |
| 5,441,332 A | * | 8/1995 | Verellen ..................... 297/483 |
| 5,544,917 A | * | 8/1996 | Loxton et al. ........... 280/801.2 |
| 5,564,785 A | * | 10/1996 | Schultz et al. ........... 297/452.2 |
| 5,609,396 A | * | 3/1997 | Loxton et al. .............. 297/473 |
| 6,050,629 A | * | 4/2000 | Bernhardt et al. ........ 296/65.01 |
| 6,109,697 A | * | 8/2000 | Lane et al. ................. 297/480 |
| 6,244,621 B1 | * | 6/2001 | Kameyoshi et al. ......... 280/733 |
| 6,666,520 B2 | * | 12/2003 | Murphy et al. ............. 297/483 |
| 6,702,326 B1 | * | 3/2004 | Fujii .......................... 280/806 |
| 6,769,716 B2 | * | 8/2004 | Rouhana et al. ........... 280/806 |
| 7,000,994 B2 | * | 2/2006 | Leighton .................... 297/484 |
| 7,036,878 B2 | * | 5/2006 | Masutani ................. 297/216.1 |
| 7,063,389 B2 | * | 6/2006 | Kennedy, Sr. .............. 297/483 |

\* cited by examiner

*Primary Examiner*—Anthony D. Barfield
*Assistant Examiner*—Erika Garrett
(74) *Attorney, Agent, or Firm*—Cantor Colburn LLP

(57) ABSTRACT

The invention relates to an integral seat of an automotive vehicle having an underframe, a seat pan carried by underframe, a seat back and a seat belt mechanism, where the seat belt mechanism includes a seat belt with a tongue member that divides the seat belt in a shoulder belt and a lap belt, the seat belt having an upper end formed by the shoulder belt and a lower end formed by the lap belt, a primary automatic belt tensioner that is disposed on the underframe and in which there is secured the lower end of the seat belt and a secondary automatic belt tensioner that is disposed in the seat back and in which there is secured the upper end of the seat belt.

15 Claims, 3 Drawing Sheets

INTEGRATED SEAT OF AN AUTOMOTIVE VEHICLE

BACKGROUND TO THE INVENTION

The invention relates to an integrated seat.

The great advantage of integrated seats is that they combine all the functions of the seat, including the function of the seat belt. As a result, integrated seats can be removed from and inserted into a vehicle as one piece and are for example suited for application as removable vehicle seats.

Integral seats have an underframe by means of which they can be secured to the underbody of an automotive vehicle. The underframe can comprise a lengthwise adjustment device with two pairs of rails. The underframe typically has two sides, namely one inboard side and one outboard side. The seat pan is carried by the underframe and may be adjustable in height and/or in tilt by means of an adjusting device. A seat back of the integral seat is secured to the seat pan or to the underframe and the amount of its recline can be adjusted. Finally, the integral seat has a seat belt mechanism with an automatic belt tensioner. Two different prior art embodiments are known: In some integral seats, the automatic belt tensioner is disposed in the seat back where it is primarily associated with the shoulder belt. This automatic belt tensioner arrangement however occupies precious space within the passenger compartment, the spacing between occupants seated behind each other being determined inter alia by the automatic belt tensioner. In another configuration, the automatic belt tensioner is associated with the underframe and is disposed in the rear lateral region of the underframe. This results in an advantageous transmission of the crash forces and in an arrangement that occupies very little space. The drawback however is that forward movement of a seat occupant is rendered much more difficult. In order for an occupant to be capable of moving his torso forward he must be given sufficient shoulder belt release. For this purpose, the automatic belt tensioner, which is disposed very low, must release the belt which must slip over the occupant in the region of the lap belt, pass through the tongue member and also slip over the torso of the occupant in the region of the shoulder belt so that slack belt material be provided between shoulder and seat back. Due to the friction conditions of the belt, forward movement of the occupant's torso is rendered much more difficult.

BRIEF SUMMARY OF THE INVENTION

This is where the invention comes in. It is the object of this invention to develop an integral seat so as to retain the advantages of a construction in which the automatic belt tensioner is associated with the underframe to provide a remedy for the disadvantages, so that a seat occupant is allowed to move his torso forward within the seat without effort on his part.

An integral seat of the invention has two automatic belt tensioners, namely a primary automatic belt tensioner and a secondary automatic belt tensioner. The secondary automatic belt tensioner is only intended to provide sufficient slack in the shoulder belt when a seat occupant wants to move his torso forward. The secondary automatic belt tensioner is designed for this purpose of utilization. Given its special destination, the secondary automatic belt tensioner can be of a much simpler implementation than the primary automatic belt tensioner and can be configured to be quite flat. It has to retract or release a much smaller amount of belt than the primary automatic belt tensioner.

The primary automatic belt tensioner preferably utilized is one such as known in prior art. Such type automatic belt tensioners cause the belt to be wound back into them, they have a substantially cylindrical shape. The secondary automatic belt tensioner, by contrast, can be configured to be quite flat, it usually does not cause the belt to wind back but merely allows linear movement of the end of the shoulder belt within the seat back.

The two automatic belt tensioners are loaded with an elastic means in such a manner that they tension and try to retract the seat belt. Preferably, the spring force of the secondary automatic belt tensioner is considerably larger than that of the primary automatic belt tensioner. When the seat belt is not in use and the seat is not occupied by an occupant, the secondary automatic belt tensioner always is in its retracted position, the primary automatic belt tensioner however is not. Accordingly, it is the primary automatic belt tensioner that tensions the seat belt when the seat is not in use. Upon fastening the seat belt, the secondary automatic belt tensioner remains in its retracted position. The belt release needed to fasten the seat belt is almost exclusively effected by the primary automatic belt tensioner. Once the belt is fastened, meaning the tongue member inserted into the buckle, the secondary automatic belt tensioner is in its retracted position and the primary automatic belt tensioner in an intermediate position. It is still capable of releasing some belt length although it has already released a considerable length thereof.

If now an integral seat occupant wearing the belt wants to move his torso forward, belt material must substantially be released between the shoulder and an upper guide means of the shoulder belt. Advantageously, the seat belt should not be allowed to move relative to the occupant during this movement. The spring forces of the two automatic belt tensioners are coordinated so that the spring force of the secondary automatic belt tensioner is smaller than the tensile force of the primary automatic belt tensioner plus the force needed for the friction movement of the belt. Accordingly, if a seat occupant moves forward within his seat, belt release is substantially effected by the secondary automatic belt tensioner. The great advantage thereof is that the belt will not have to slip over the occupant's body.

If now an accident were to occur in the very instant a seat occupant has moved his torso completely to the front, the following will happen:

The upper end of the seat belt is secured within the secondary automatic belt tensioner, said securement being such that it also resists tensile loads generated by an accident. In order to achieve that the back of the occupant rests on the seat back while the accident actually happens, the belt must be tensioned and tightened. Usually, the integral seats are equipped with what are termed belt tighteners that are activated by a crash sensor. Such a belt tightener can be associated with the lower end of the lap belt. It usually has a tensile force sufficient to tension the belt in such a manner that in spite of the friction exerted by the belt onto the occupant the occupant's back is retained so as to fit against the seat back.

In an improved embodiment, the secondary automatic belt tensioner also has a belt tightener. The latter can only be enabled when the secondary automatic belt tensioner is not in its retracted position. It may however also be basically provided to tighten the shoulder belt.

The term occupant is meant to include the driver of an automotive vehicle. In a preferred embodiment, the buckle is provided on the inboard side of the seat. The primary automatic belt tensioner is preferably disposed on the outboard side. The same applies to a lower guide means. The lap belt exits the lower guide means in a correct position and location. This makes it possible to dispose the primary automatic belt tensioner in a constructionally advantageous manner. It should be located substantially underneath the lower guide means. It is possible to cause the belt to deflect via a pulley or the like, though.

The secondary automatic belt tensioner can be configured to be of a much smaller size than the primary automatic belt tensioner. It thus occupies less space. In addition, it can be disposed within a seat back of normal construction, with no need for additional space;

The secondary automatic belt tensioner can be constructed in accordance with the prior art principles for constructing primary automatic belt tensioners. It may more specifically be designed as a small primary automatic belt tensioner. Even though it is constructed like a primary automatic belt tensioner it needs less space as it can be built at a much smaller size than fully functional automatic belt tensioners because the belt length it has to wind back is shorter than the belt length a primary belt tensioner has to wind back.

It has been found advantageous to equip the secondary automatic belt tensioner with a load limiter. The latter retains the belt when a tensile load occurs in the event of a crash. It is activated by the crash sensor.

The advantage of the invention is that the seat belt of the invention is convenient to handle and to use in practice. The two automatic belt tensioners provide the seat occupant with clearly increased comfort and with more freedom of movement than the prior art. With regard to construction, the invention makes it possible to advantageously make use of existing space intended for construction and more specifically eliminates the need for increasing the spacing between two occupants seated behind each other as a result of the conditions dictated by the construction of a primary automatic belt tensioner.

BRIEF DESCRIPTION OF THE DRAWINGS

Further advantages and characteristics of the invention will become apparent upon reading the remaining claims and the following description. Exemplary embodiments of the invention, which are not intended to limit the scope of the invention, are explained and described in closer detail hereinafter. Reference will be thereby made to the drawing. In said drawing:

DETAILED DESCRIPTION OF THE INVENTION

Figure 1:
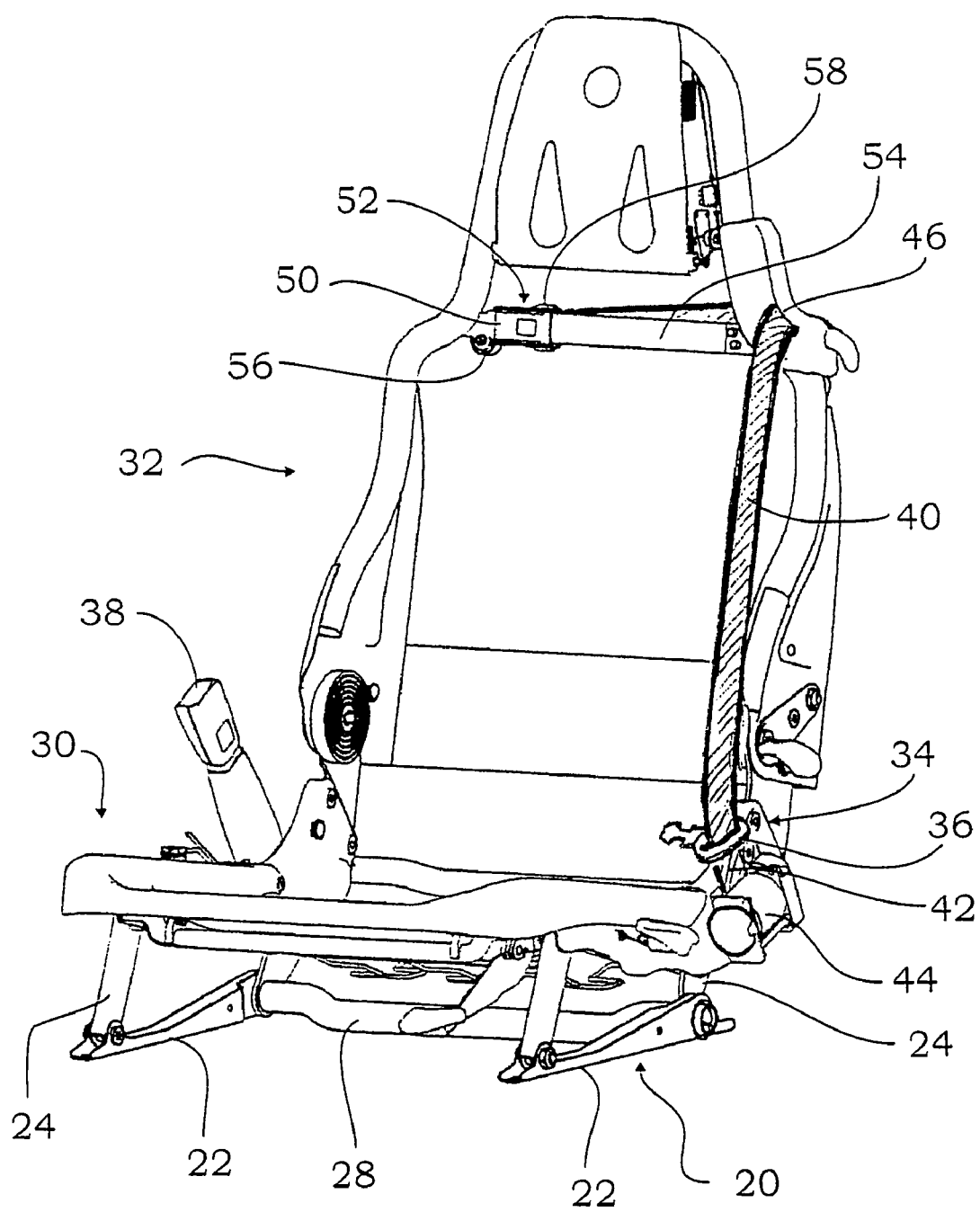
FIG. 1 is a perspective illustration of an integral seat having the seat belt mechanism of the invention, in an oblique front view, the integral seat having no padding

The integral seat illustrated in the Figs. has an underframe 20 comprising a left and a right carrier profile 22. Securement to an underbody of an automotive vehicle that has not been illustrated herein is effected via said carrier profile members. The underframe 20 further has front pivot arms 24 and rear pivot arms 26. The motions of the rear pivot arms 26 are linked together by a tie bar 28. Said underframe carries a seat pan 30 and a seat back 32 the recline of which is adjustable relative to the seat pan 30.

Further, a seat belt mechanism is provided that comprises a seat belt 34 configured in a manner well known in the art. It has a tongue member 36 that cooperates with a buckle member 38. Said buckle member 38 is firmly secured to the seat pan 30. In the respective Figs., the seat belt 34 is in the zero position, meaning it is not fastened. The tongue member 36 is located opposite the buckle member 38, on the opposite side of the seat.

The tongue member 36 divides the seat belt into a shoulder belt 40 and a lap belt 42, both being parts of the single piece seat belt 34. The lap belt 42 forms a lower end (not shown) of the seat belt 34, which is retained in a primary automatic belt tensioner. In the position shown, the lap belt 42 is substantially wound inside the primary automatic belt tensioner 44 i.e., retracted. Also, as can be seen from the Figs., the primary automatic belt tensioner 44 keeps the entire seat belt 34 in the slightly tensioned position. The shoulder belt 40 passes through an upper guide means 46 which is configured in the form of a slot and is located approximately on the height of the left shoulder of a potential seat occupant. From said upper guide means 46, the shoulder belt 40 is oriented substantially horizontally toward an upper end (not shown) of the seat belt 34.

Figure 2:
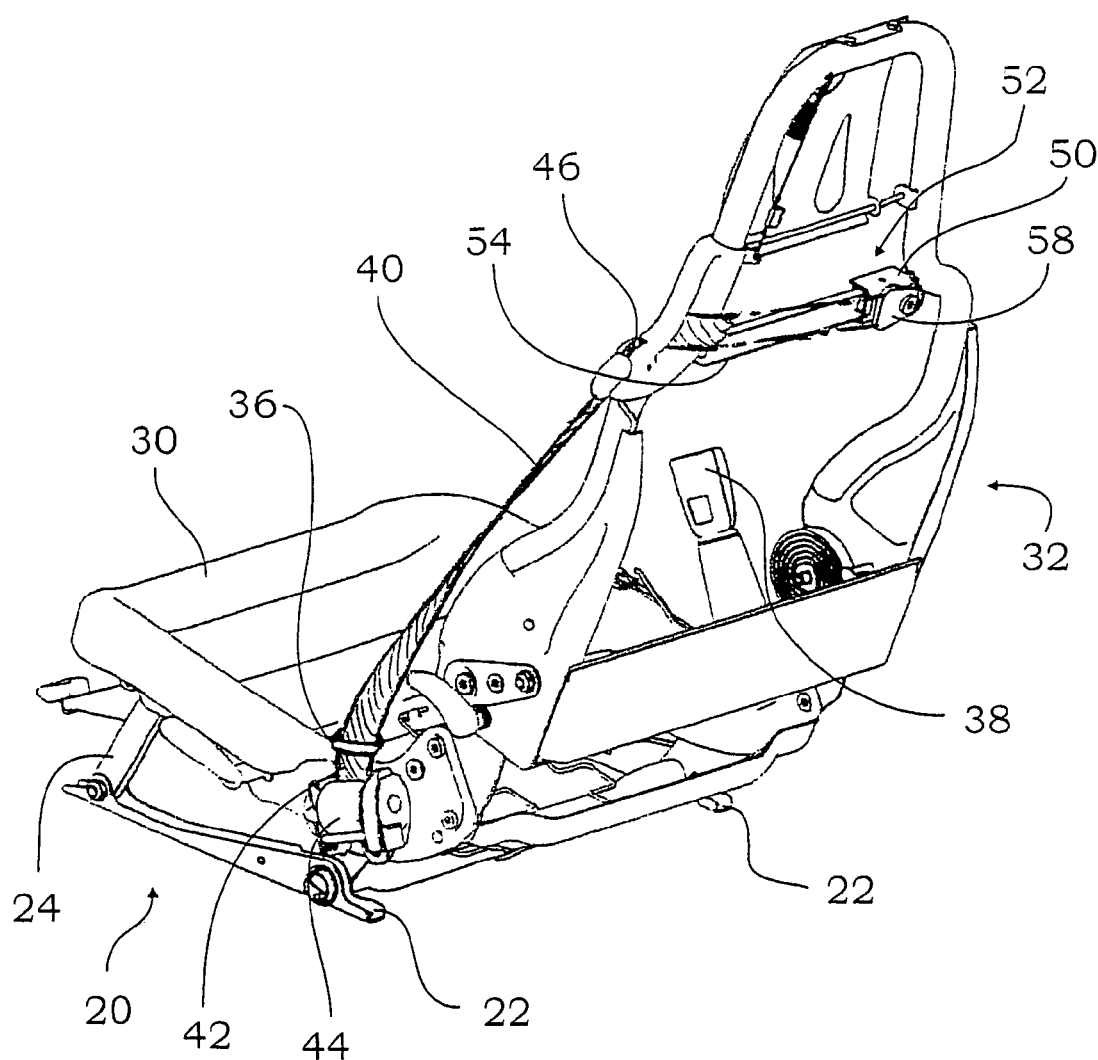
FIG. 2 is an oblique rear top view of the integral seat in accordance with FIG. 1

In the embodiment in accordance with the FIGS. 1 and 2, the upper end is located in a carriage 50. Said carriage 50 is part of a secondary automatic belt tensioner 52. The latter also includes a strut that reinforces the seat back 32 on the one side and is also provided as a guide for the carriage 50 on the other side.

The carriage 50 is elastically biased toward the end position shown in the Figs. by a roller spring 56. Said roller spring 56 functions in a way similar to that of a spring tape measure. It effects a substantially constant spring force along the displacement path of the carriage 50. Said spring force is greater than the spring force of the primary automatic belt tensioner 44 so that, in the zero position shown in the Figs., the secondary automatic belt tensioner 52 is in its retracted position and the primary automatic belt tensioner 44 in an intermediate position, and in no case in an end position.

As can be seen from the FIGS. 1 and 2, the shoulder belt 40 is inclined at an acute angle relative to the strut 54 and, as a result thereof, to the carriage 50. As shown in FIG. 2, it is secured to a pivot member 58 that can be pivoted relative to the carriage 50. As best shown in FIG. 2, the pivot member 58 is linked to the carriage 50 quite far in the rear portion thereof. A strong pull on the shoulder belt 40 causes the carriage 50 to jam as a result of the oblique pull applied in the pivot member 58. Normal belt loads will not cause the carriage 50 to jam; they will rather allow the latter to move. A load limiter similar to that provided with the primary automatic belt tensioner 44, which is a commercially available part, is thus achieved.

Typically, the secondary automatic belt tensioner 52 is locked at an acceleration of 0.45 g on the seat belt. In the corresponding range, the primary automatic belt tensioner 44 can also become locked.

It can be seen from FIG. 1 that the path that is made possible by the secondary automatic belt tensioner 52 is much smaller than the path the primary automatic belt tensioner 44 must provide. On the one side, departing from the zero position shown in FIG. 1, the primary automatic belt tensioner 44 must allow sufficient belt material to be released to form the lap belt over an occupant's body. Additionally, some more belt length must be pulled out for the shoulder belt, which is too short in the position shown in FIG. 1. The maximum path the secondary automatic belt tensioner is capable of providing, departing from the position shown in FIG. 1, is limited by the right edge of the carriage 50 abutting on the right end of the strut where two fixation points are shown. This path is but one fourth of the path the primary automatic belt tensioner 44 is capable of providing.

In the exemplary embodiments shown, the primary automatic belt tensioner 44 is secured to the seat pan 30, more specifically in proximity to the upper pivot joint of the rear outboard pivot arm 26. As a result, the position of the lap belt 42 is independent of the adjustment of the seat pan 30, e.g., of a height adjustment. Put another way, the lap belt 42 needs not be displaced relative to an occupant when the latter is adjusting the seat pan 30.

Figure 3:
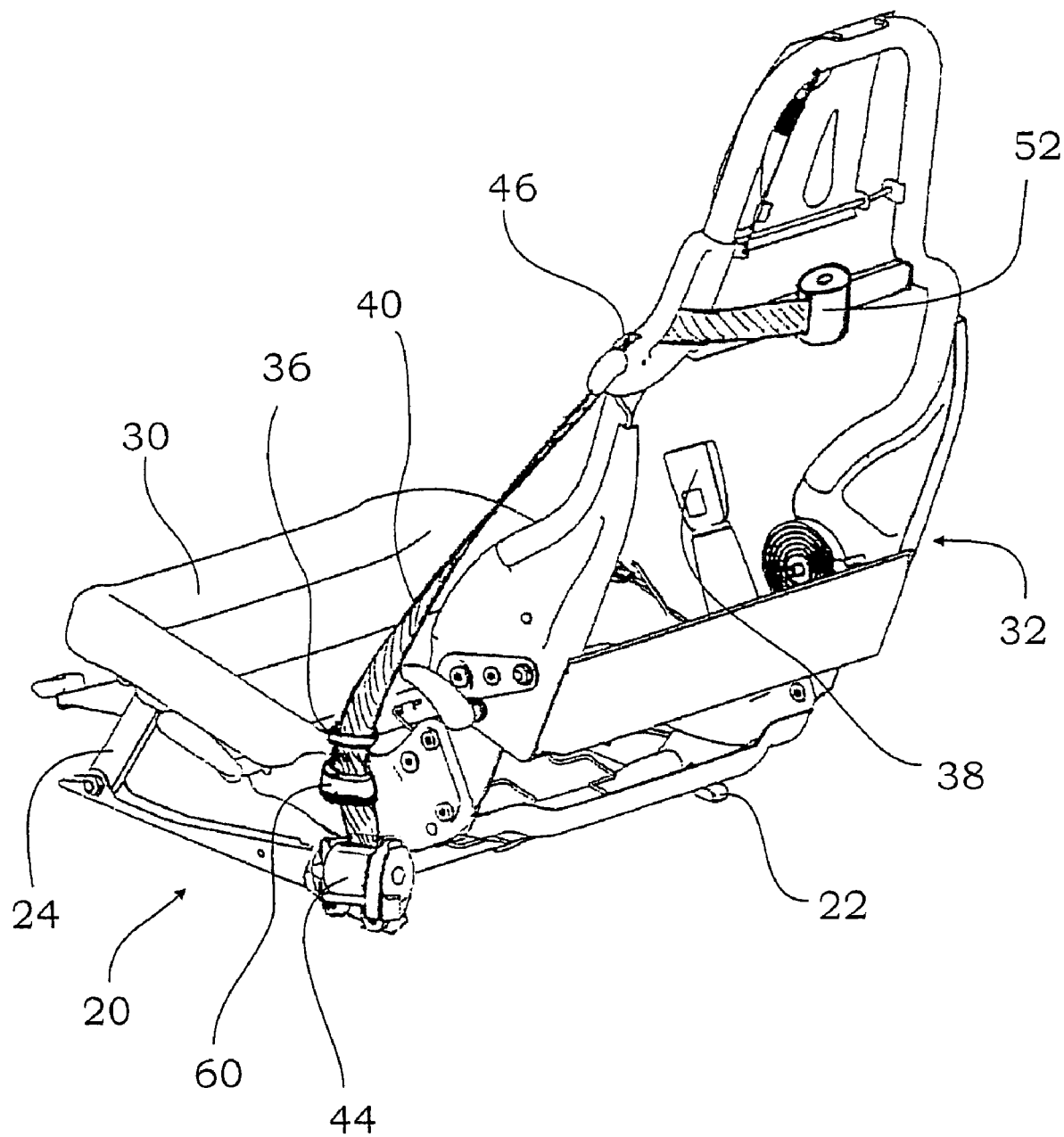
FIG. 3 is an oblique rear top view of another implementation of the seat belt arrangement of the integral seat.

It is also possible to dispose the primary automatic belt tensioner 44 on the underframe 20 e.g., in proximity to the lower pivot joint of the rear pivot arm 26. FIG. 3 shows a corresponding implementation. Additionally, a lower guide means 60 is provided, for example in proximity to the upper pivot joint of the rear outboard pivot arm 26. Said lower guide means is substantially located above the primary automatic belt tensioner 44. The latter is again an automatic belt tensioner as it is currently commercially available.

As compared to the first exemplary embodiment, the secondary automatic belt tensioner 52 is modified in FIG. 3. It is now configured similar to the primary automatic belt tensioner, but with much smaller dimensions. This is possible because the wind-back path is considerably smaller. Further, particular provisions have been made to configure the secondary automatic belt tensioner to be as small as possible. As contrasted with the first exemplary embodiment, the second automatic belt tensioner winds the belt back and does not cause it to execute a linear movement.

Other configurations of the secondary automatic belt tensioner are possible. It is for example possible to secure the end of the shoulder belt 40, that is the upper end thereof, at the site where the carriage is located in the first exemplary embodiment. An elastic means for deflecting the belt is placed in the substantially horizontal orientation thereof so that the belt is given a V-shaped orientation. If an occupant wants to move his torso forward, this V-shaped deflection is used up until straight line orientation is achieved. In the event of a crash, the V-shaped deflection is used up by a belt tightener.

The invention claimed is:

1. An integral seat of an automotive vehicle comprising:
an underframe;
a seat pan carried by said underframe;,
a seat back; and
a seat belt mechanism;
wherein said seat belt mechanism comprises a seat belt with a tongue member that divides the seat belt into a shoulder belt and a lap belt, said seat belt having an upper end formed by the shoulder belt and a lower end formed by the lap belt, said lap belt and said shoulder belt being parts of a single piece belt, a -primary automatic belt tensioner that is disposed on the underframe and in which there is secured the lower end of the seat belt, wherein the integral seat includes no more than a single primary automatic belt tensioner; and a secondary automatic belt tensioner that is disposed in the seat back and in which there is secured the upper end of the seat belt, wherein the integral seat includes no more than a single secondary automatic belt tensioner; said seat belt mechanism further comprising a buckle that cooperates with the tongue member of the seat belt and is disposed on one side of the seat pan, said seat belt mechanism further comprising an upper guide means disposed out of contact with the secondary belt tensioner, said upper guide means being configured to guide the shoulder belt disposed laterally to the seat back in an upper portion thereof, and in a distance from the secondary seat belt tensioner.

2. The integral seat in accordance with claim 1, further comprising a lower guide means for guiding the lap belt disposed laterally to the seat pan.

3. The integral seat in accordance with claim 1, further comprising a lower guide means disposed on a side of the integral seat that is different from that of the buckle.

4. The integral seat in accordance with claim 1, further comprising a lower guide means and/or an upper guide means disposed on a same side of the integral seat.

5. The integral seat in accordance with claim 4, wherein the lower guide
means and the upper guide means are disposed on an outboard side of the integral seat.

6. The integral seat in accordance with claim 1, wherein the secondary automatic belt tensioner comprises a belt tightener.

7. The integral seat in accordance with claim 1, wherein the secondary automatic belt tensioner comprises a load limiter.

8. The integral seat in accordance with claim 1, wherein a path of the secondary automatic belt tensioner is smaller than a wind-back path of the primary automatic belt tensioner.

9. The integral seat in accordance with claim 8, wherein the path of the
secondary automatic belt tensioner is half the length of the wind-back path of the primary automatic belt tensioner.

10. The integral seat in accordance with claim 8, wherein the path of the secondary automatic belt tensioner is one fourth the length of the wind-back path of the primary automatic belt tensioner.

11. The integral seat in accordance with claim 1, wherein, when the seat belt is not in use, the secondary automatic belt tensioner is in a fully retracted position whereas the primary automatic belt tensioner has not yet reached the fully retracted position.

12. The integral seat in accordance with claim 1, wherein each automatic belt tensioner exerts onto the seat belt a tensile force and wherein the tensile force exerted onto the seat belt by the secondary automatic belt tensioner is larger than the tensile force exerted onto the seat belt by the primary automatic belt tensioner.

13. The integral seat in accordance with claim 1, wherein, in a normal utilization position, when the seat belt is fastened around an occupant resting with his back against the seat back, the secondary automatic belt tensioner is in its fully retracted position.

14. The integral seat in accordance with claim 1, wherein, when the seat belt is fastened on the occupant seated on the integral seat and when the latter moves forward within said integral seat, the secondary automatic belt tensioner releases a much greater amount of belt than the primary automatic belt tensioner.

15. The integral seat in accordance with claim 1, further comprising a lower guide means for guiding the lap belt disposed laterally to the seat pan and located above the primary automatic belt tensioner.

* * * * *